United States Patent
Sarchi et al.

(10) Patent No.: US 9,400,221 B2
(45) Date of Patent: Jul. 26, 2016

(54) METHOD FOR DETECTING TORSION IN A CABLE, ELECTRIC CABLE WITH TORSION SENSOR AND METHOD FOR MANUFACTURING SAID CABLE

(75) Inventors: Davide Sarchi, Milan (IT); Luca Palmieri, Padova (IT)

(73) Assignee: PRYSMIAN S.P.A., Milan (IT)

( * ) Notice: Subject to any disclaimer, the term of this patent is extended or adjusted under 35 U.S.C. 154(b) by 12 days.

(21) Appl. No.: 14/382,919

(22) PCT Filed: Mar. 5, 2012

(86) PCT No.: PCT/EP2012/053736
§ 371 (c)(1),
(2), (4) Date: Sep. 4, 2014

(87) PCT Pub. No.: WO2013/131549
PCT Pub. Date: Sep. 12, 2013

(65) Prior Publication Data
US 2015/0040681 A1 Feb. 12, 2015

(51) Int. Cl.
*G01N 3/32* (2006.01)
*G01L 1/24* (2006.01)
(Continued)

(52) U.S. Cl.
CPC . *G01L 1/242* (2013.01); *G01L 3/12* (2013.01); *G01L 5/105* (2013.01); *G01M 5/0025* (2013.01);
(Continued)

(58) Field of Classification Search
CPC .... G01L 1/242; G01M 5/0025; G01M 3/047; G01M 11/336; G01N 2021/638; G01N 21/23
USPC ..................... 73/800, 847, 862.624
See application file for complete search history.

(56) References Cited

U.S. PATENT DOCUMENTS

| 5,182,779 A | 1/1993 | D'Agostino et al. |
| 2004/0258373 A1 | 12/2004 | Andreassen |

(Continued)

FOREIGN PATENT DOCUMENTS

| CN | 10148890 A | 6/2009 |
| CN | 102159978 A | 8/2011 |

(Continued)

OTHER PUBLICATIONS

International Search Report from the European Patent Office for International Application No. PCT/EP2012/053736, mailing date Nov. 23, 2012.
(Continued)

*Primary Examiner* — Max Noori
(74) *Attorney, Agent, or Firm* — Finnegan, Henderson, Farabow, Garrett & Dunner, L.L.P.

(57) ABSTRACT

A method for monitoring a torsional state of a cable having a central longitudinal axis, includes providing a cable including a torsion sensor longitudinally extending along the cable, the torsion sensor including a single-mode optical fiber arranged substantially along the central longitudinal axis of the cable, and at least three longitudinal structural elements, at least one of the longitudinal structural elements being an electrically conductive core, wherein the torsion sensor is mechanically coupled with at least one of the longitudinal structural elements; measuring a torsional state of the single-mode optical fiber by polarization-sensitive optical reflectometry; and associating the torsional state of the cable along the longitudinal axis with the measured torsional state of the single-mode optical fiber.

12 Claims, 5 Drawing Sheets

(51) Int. Cl.
*G01M 5/00* (2006.01)
*G01M 11/08* (2006.01)
*G01L 3/12* (2006.01)
*G01L 5/10* (2006.01)

(52) U.S. Cl.
CPC .......... *G01M 5/0041* (2013.01); *G01M 5/0091* (2013.01); *G01M 11/086* (2013.01); *Y10T 29/49004* (2015.01)

(56) References Cited

U.S. PATENT DOCUMENTS

| | | | |
|---|---|---|---|
| 2005/0226584 | A1 | 10/2005 | Williams et al. |
| 2008/0105449 | A1* | 5/2008 | Kenny ................. H01B 7/0233 174/34 |
| 2008/0226218 | A1* | 9/2008 | Abe ........................ G01L 1/243 385/13 |
| 2009/0250241 | A1 | 10/2009 | Galletti et al. |
| 2010/0277329 | A1 | 11/2010 | Worzyk |
| 2011/0170836 | A1 | 7/2011 | Consonni et al. |
| 2011/0205526 | A1* | 8/2011 | Brown ................... G01B 11/18 356/32 |
| 2012/0082422 | A1 | 4/2012 | Sarchi et al. |
| 2012/0174683 | A1* | 7/2012 | Kemnitz ................. H01B 7/32 73/800 |
| 2014/0053654 | A1* | 2/2014 | Rogge ....................... G01L 1/24 73/800 |

FOREIGN PATENT DOCUMENTS

| | | |
|---|---|---|
| EP | 0 203 249 | 12/1986 |
| GB | 2 401 940 | 11/2004 |
| GB | 2 413 629 | 11/2005 |
| WO | WO 2004/028989 | 4/2004 |
| WO | WO 2004/031091 | 4/2004 |
| WO | WO 2005/035461 | 4/2005 |
| WO | WO 2008/037291 | 4/2008 |
| WO | WO 2010/037229 A | 4/2010 |
| WO | WO 2010/136062 | 12/2010 |
| WO | WO 2011/032587 | 3/2011 |

OTHER PUBLICATIONS

Burgmeier et al.; "Fiber Optic Sensor System for Stress Monitoring in Power Cables", 2009 Conference on Lasers and Electro-Optics (CLEO), IEEE, 2 pages, (2009).
Galtarossa et al.; "Spatially Resolved PMD Measurements", IEEE, Journal of Lightwave Technology, vol. 22, No. 4, pp. 1103-1115, (2004).
Galtarossa et al.; "Reflectometric Measurement of Birefringence Rotaton in Single-Mode Optical Fibers", Optical Letters, vol. 33, No. 20, pp. 2284-2286, (2008).
Galtarossa et al.; "Spin-Profile Characterization in Randomly Birefringent Spun Fibers by Means of Frequency-Domain Relfectometry", Optics Letters, vol. 34, No. 7, pp. 1078-1080 (2009).
Jopson et al.; "Measurement of Second-Order Polarization-Mode Disperson Vectors in Optical Fibers", IEEE Photonics Technology Letters, vol. 11, No. 9, pp. 1163-1155, (1999).
Soller et al.; "High Resolution Optical Frequency Domain Reflectometry for Characterization of Components and Assemblies", Optics Express, vol. 13, No. 2, pp. 666-674, (2005).
Calvani et al.; "Real-Time Heterodyne Fiber Polarimetry With Narrow-And Broad-Band Sources", Journal of Lightwave Technology, vol. LT-4, No. 7, pp. 877-883, (1986).
Kanatani; "Analysis of 3-D Rotation Fitting", IEEE Transactions on Pattern Analysis and Machine Intelligence, vol. 16, No. 5, pp. 543-549, (1994).
Canny; "A Computational Approach to Edge Detection", IEEE Transactions on Pattern Analysis and (1986). Machine Intelligence, vol. PAMI-8, No. 6, pp. 679-698, (1986).
Ellison et al.; "Automatic Matrix-Based Analysis Method for Extraction of Optical Fiber Parameters From Polarimetric Optical Time Domain Reflectometry Data", Journal of Lightwave Technology, vol. 18, No. 9, pp. 1226-1232, (2000).

* cited by examiner

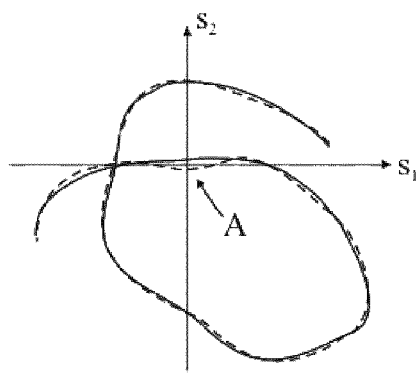
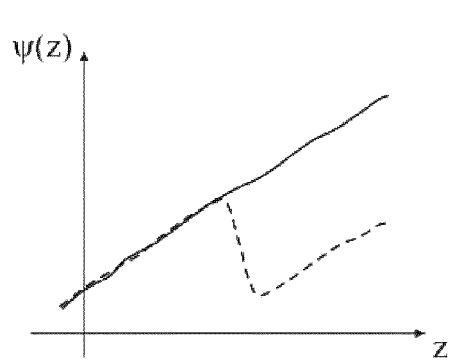
FIG. 7(a)   FIG. 7(b)
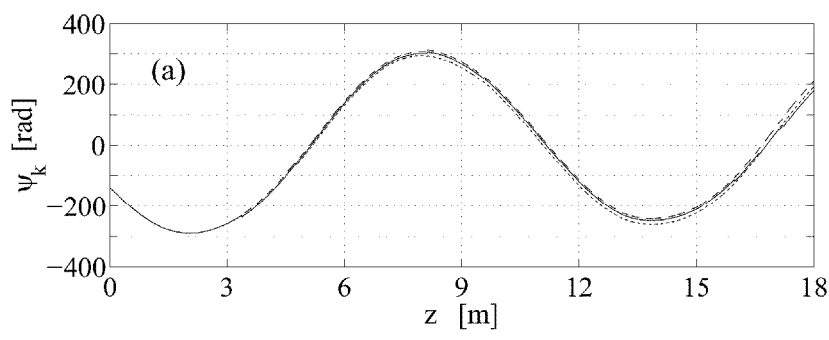
FIG. 8(a)
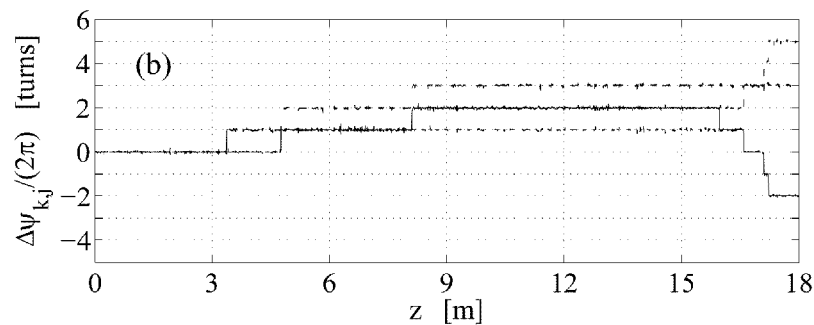
FIG. 8(b)
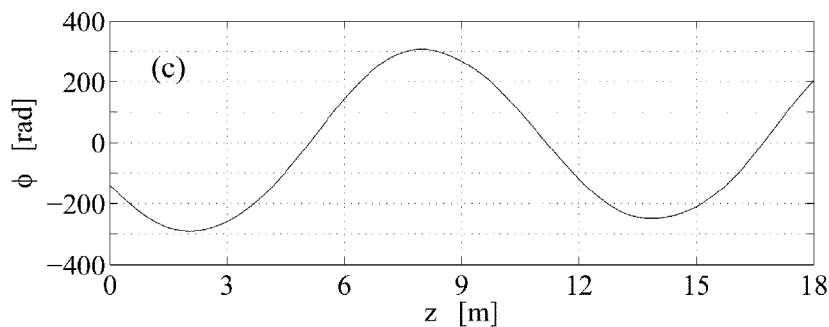
FIG. 8(c)

METHOD FOR DETECTING TORSION IN A CABLE, ELECTRIC CABLE WITH TORSION SENSOR AND METHOD FOR MANUFACTURING SAID CABLE

CROSS REFERENCE TO RELATED APPLICATION

This application is a national phase application based on PCT/EP2012/053736, filed Mar. 5, 2012, the content of which is incorporated herein by reference.

FIELD OF THE INVENTION

The present invention is directed to a monitoring method for determining the torsion distributed along an electric cable.

The present invention relates also to an electric cable with an integrated torsion sensor, particularly suitable for distributed measurements of torsion along the cable, and to a process for manufacturing thereof.

BACKGROUND OF THE INVENTION

Cables for heavy-duty applications and in particular for mobile installations, such as mobile harbour cranes, ship-to-shore container cranes, ship un-loaders, spreaders, mining and tunneling equipment, and windmill and windfarm are specifically designed to withstand harsh environment conditions and high mechanical stresses, such as tensile forces and torques. Within the present description, we will in general refer to heavy-duty cables, when referring to cables for heavy-duty applications and in particular, but not exclusively, for mobile installations.

In some applications, such as in heavy-duty applications, transfer of the cable to the equipment reels and forced guidance during the winding and unwinding phases may give rise to undesired torsions that can vary along the cable length. Although care is normally recommended in handling and installation of the cable in the mobile equipments, such as a direct transfer of the cable from the original drum to the cable reel while avoiding changes of direction or inversions of the original direction of winding, working conditions may induce relatively large and abrupt torques thereof. In addition, other systems for cable movement, such as guidance devices, pulley systems and tender systems, may involve torsions of the cable during operation, in particular if applications require high-speed operation and/or multiple cable deflection in the cable payout.

Optical sensors useful for measuring and/or monitoring mechanical stresses in an electric cable are known.

WO 2010/136062 describes an electric cable comprising a strain sensor longitudinally extending along the cable and including a strain optical fibre arranged within a bending neutral region surrounding and including a bending neutral longitudinal axis of the electric cable, and at least two longitudinal structural elements, at least one of the at least two longitudinal structural elements being a core comprising an electrical conductor, wherein the strain sensor is embedded in a strain-transferring filler mechanically coupling at least one of the at least two longitudinal structural elements with the strain sensor. With the disclosed cable construction, the strain experienced by the at least one of the at least two longitudinal structural elements is transferred to the strain sensor at least in a strained condition.

WO 2011/032587 relates to a method for monitoring the torsion of a cable comprising the steps of providing a cable with at least one identification tag, preferably an RFID tag, arranged in a tag angular position in a cross-sectional plane taken transverse to the longitudinal direction and detecting the tag electromagnetic signal. The cable is provided with a plurality of identification tags, each tag being arranged in a respective tag angular position.

J. Burgmeier et al. in "*Fiber optic sensor system for stress monitoring in power cables*", published in 2009 Conference on Lasers and Electro-Optics (CLEO), describe a fibre optic sensor system for monitoring stress factors such as temperature, squeezing, bending and torsion in power cables using a short pulse and broadband light source. Monitoring bending and torsion is performed via fibre Bragg gratings (FBGs) and uses a broadband source, achieved by supercontinuum generation. To use standard single mode fibres, which are frequently used within power cables for data transmission, the FBG is written into the fibre by point by point femtosecond laser inscription. Bending the fibre which is integrated into the power cable results in a change of the grating period of the FBG and thus different wavelengths from the broadband source will be reflected and easily monitored by a compact spectrometer.

Radiation loss occurs when a single mode fibre is bent. Polarisation-sensitive optical time domain reflectometry (P-OTDR) was proposed as a tool to measure the birefringence of single-mode optical fibres. P-OTDR provides the evolution of the state of polarisation (SOP) of the Rayleigh backscattering field, whereas information about the birefringence from the measured SOPs is derived by data modelling and analysis.

Polarization sensitive reflectometers are a special class of optical reflectometers that aims at measuring the state of polarization (SOP) of the optical field backscattered by an optical fibre, due to Rayleigh scattering, as a function of the position along the fibre where the scattering takes place. In general, the optical fibre under test is probed with a known, polarization-controlled, probe optical signal (e.g. a pulse or a frequency modulated signal), while the backscattered optical field is measured as a function of time with a polarization sensitive receiver. Owing to the knowledge of the probe signal and of the propagation speed of light in the specific fibre, it is then possible to convert the time variations in a longitudinal map of the local properties of the fibre under test.

A review of theory and applications of polarisation-sensitive optical time-domain reflectometry (P-OTDR), in particular related to polarisation mode dispersion (PMD) in single-mode fibres, is given is "*Spatially Resolved PMD Measurements*" by A. Galtarossa and L. Palmieri, published in Journal of Lightwave Technology, col. 22 (2004), pages 1103-1115.

A. Galtarossa et al., "*Reflectometric measurement of birefringence rotation in single-mode fibers*", Optics Letters, vol. 33 (2008), pages 2284-2286, disclose a reflectometric technique for the measurement of orientation and modulus of the linear birefringence vector in single-mode optical fibres. The technique provides information also on circular birefringence, although this component, if present, appears as a rotation of the linear birefringence. Deterministic rotations may be caused by either a twist or a spin applied to the fibre.

A. Galtarossa et al., "*Spin-profile characterization in randomly birefringent spun fibers by means of frequency-domain reflectometry*", Optics Letters, vol. 34 (2009), pages 1078-1080 show that the angle of rotation of birefringence, and hence the spin profile, of an optical fibre can be measured by polarisation-sensitive optical frequency-domain reflectometry (P-OFDR). The P-OFDR technique was applied to a fibre sample of a few tens of meters long.

The Applicant has tackled the problem of monitoring torsion in a cable in use and of providing a reliable measurement of the actual deployment of the cable, which can be performed, for example periodically, throughout the lifetime of the cable.

The Applicant has observed that a solution as that described in WO 2011/032587 provides information about the local rotational state of the cable, in particular on the longitudinal portion of the cable that has passed through the reading device capable of transmitting interrogation electromagnetic signals and of receiving the tag electromagnetic signal transmitted by the tag(s) placed across the cable portion detected by the reading device.

In some applications, such as in cables for heavy-duty applications, it is desirable to determine the torsion distributed along the cable length. In particular, it can be desirable to monitor the temporal evolution of the distributed torsional state along the cable, for example by comparing results from measurements taken at different times so that to adjust, if necessary, guiding rollers and reels. In some applications, evaluation of the torsional state along the cable can predict the residual lifetime of the cable.

SUMMARY OF THE INVENTION

The Applicant has realised that polarization-sensitive reflectometry can effectively characterise the local polarization properties of a single-mode optical fibre inserted in a fibre optic sensor comprised in a cable. From the polarisation properties it is possible to derive the birefringence distributed along the fibre and from the latter to calculate the rotational state of the fibre of the fibre optic sensor.

The Applicant has understood that if a fibre optic sensor is integrated in the cable in such a way that a torque experienced in the cable is transferred in a reliable and measurable rotation or twist in the fibre optic sensor, detecting the local polarisation properties of the fibre of the fibre-optic sensor provides information on the torsion distributed along the cable length.

The Applicant has found that a distributed measurement of the torsion of an electric cable comprising a longitudinal structural element can be performed by analysing the spatial distribution of the state of polarisation of the light backscattered from a fibre optic sensor embedded in the cable, the sensor being mechanically coupled to said longitudinal structural element and comprising a single-mode optical fibre arranged substantially along a central longitudinal axis of the cable.

Mechanical coupling of the fibre optic sensor to said longitudinal structural element provides a univocal correspondence between the distributed rotational state along the fibre of the fibre optic sensor, obtained by using polarisation-sensitive reflectometry, and the torsion distributed along the cable length. The fibre optic sensor will be referred in the following to as the torsion sensor.

The optical fibre of the torsion sensor is referred in the present description and appended claims to as the single-mode optical fibre.

According to an aspect consistent with the present disclosure, a method for monitoring a torsional state of a cable having a central longitudinal axis is provided, the method comprising:
providing a cable including a torsion sensor longitudinally extending along the cable, said torsion sensor including a single-mode optical fibre arranged substantially along the central longitudinal axis of the cable, and at least three longitudinal structural elements, at least one of the longitudinal structural elements being an electrically conductive core, wherein the torsion sensor is mechanically coupled with at least one of the longitudinal structural elements;
measuring a torsional state of the single-mode optical fibre by polarisation-sensitive optical reflectometry, and
associating the torsional state of the cable along the longitudinal axis with the measured torsional state of the single-mode optical fibre.

In some embodiments, the method further comprises comparing the measured torsional state of the single-mode optical fibre with a reference torsional state of the single-mode optical fibre before associating the torsional state of the cable with the measured torsional state of the single-mode optical fibre.

In some preferred embodiments, measuring a torsional state of the single-mode optical fibre comprises:
injecting a probe optical signal having a predetermined input polarization state into an end of the single-mode optical fibre;
detecting a backscattered optical signal corresponding to the injected probe optical signal, and
measuring a state of polarisation of the backscattered optical signal by polarisation-sensitive optical reflectometry.

Preferably, the steps of injecting and detecting comprise injecting a plurality of probe optical signals having distinct input polarisation states into an end of the single-mode optical fibre and detecting a corresponding plurality of backscattered optical signals. In particular and according to some embodiments, the input state of polarisation of each of the plurality of probe optical signals is different from the input state of polarisation of the remaining signals of the plurality of probe optical signals.

Within the present description and claims, the term "plurality" means "two or more", unless expressly specified otherwise.

According to preferred embodiments, measuring a torsional state of the single-mode optical fibre comprises:
injecting a plurality of polarised probe optical signals having distinct input states of polarization into an end of the single-mode optical fibre;
detecting a plurality of backscattered optical signals, each of the plurality of backscattered optical signals having an output state of polarisation;
measuring the output states of polarisation of the backscattered optical signals;
calculating a birefringence angle function as a function of longitudinal position of the single-mode optical fibre from the measured output states of polarisation, and
calculating a rotational angle function of the single-mode optical fibre from the birefringence angle function as a function of the longitudinal position in the single-mode optical fibre, and
associating the torsional state of the cable with the calculated rotational angle function.

Preferably, before injecting a plurality of polarised probe optical signals, the method comprises preparing a reference birefringence angle function relative to a reference rotational state of the cable, wherein calculating a rotational angle function comprises calculating the variation of the calculated birefringence angle function with respect to the reference birefringence angle function.

In some embodiments, before injecting a plurality of probe optical signal, the method comprises connecting an end of the single-mode optical fibre to a measuring apparatus using a polarisation-sensitive optical reflectometry technique, wherein injecting the plurality of probe optical signals is into the connected end of the single-mode fibre.

A polarization-sensitive reflectometry technique analysing the backscattered field from a probed optical fibre can be implemented in different configurations. At least one measuring apparatus can be used to implement the method according to the present disclosure.

In some embodiments, the measuring apparatus is a polarisation-sensitive optical time domain reflectometer. Preferably, the reflectometer uses a plurality of polarised optical pulses as the plurality of polarised probe optical signals.

In other embodiments, the measuring apparatus is a polarisation-sensitive frequency domain reflectometer. Preferably, the measuring apparatus probes the single-mode optical fibre with a plurality of frequency modulated continuous optical signals.

In some embodiments, each of the plurality of the backscattered optical signals are backscattered from the end of the single-mode optical fibre following injection of a respective probe optical signal of the plurality of polarised probe optical signals. However, the present disclosure is not limited to a method in which single probe optical signals are sequentially injected into the probed fibre.

In some embodiments, the plurality of polarised probe optical signals is a plurality of N probe optical signals having distinct input states of polarisation, with N≥3, so that the amount of measured output states of polarisation is equal to N, and the method further comprises:
  grouping the N measured output states of polarisation in G groups of measured output states of polarisations, each group comprising at least two measured output states of polarization and being distinct from the remaining (G−1) groups by at least one measured output state of polarisation,
  calculating a birefringence angle function from each group so as to obtain a plurality of group birefringence angle functions,
  calculating an average value of the group birefringence angle functions, and
  calculating the rotational angle function from the average value of the group birefringence angle functions.

In an embodiment, in order to reveal and to correct measurement artefacts, for example apparent abrupt angle discontinuities or jumps, after calculating a birefringence angle function for each group and before calculating an average birefringence angle function, the method comprises analysing the plurality of group birefringence angle functions to reveal a discontinuity caused by these artefacts. When a discontinuity in a first group birefringence angle function is revealed at a longitudinal position along the fibre length, the discontinuity can be corrected and an average value can be calculated from the first group angle function corrected so as to eliminate the discontinuity, and from the remaining of the plurality of group angle functions.

According to an embodiment, calculating a birefringence angle function further comprises:
  calculating a difference function between each pair of group birefringence angle functions of two different groups;
  analysing each difference function to detect the presence of a discontinuity in a group birefringence angle function comprised in a pair at a longitudinal position in the single-mode optical fibre, the discontinuity representing an angle jump of 2πm, where m is an integer number;
  determining which group birefringence angle function of the pair comprises the discontinuity, and
  marking a discontinuity length region in the group birefringence angle function of the pair containing the discontinuity, the discontinuity length region being around and comprising the longitudinal position corresponding to the discontinuity,
  wherein the birefringence angle function containing the discontinuity is taken into account in the calculation of the average value of the group birefringence angle functions only for the longitudinal positions outside the discontinuity length region.

Preferably, N is of from 3 to 7.

In a preferred embodiment, each group has the same number M of measured output states of polarizations.

In a preferred embodiment, M is equal to (N−1).

In an embodiment, determining which group birefringence angle function of the pair comprises the discontinuity comprises determining the smoothness of each group birefringence angle function of the pair in the discontinuity length region.

Preferably, the torsion sensor is mechanically coupled to the at least three longitudinal structural elements.

Preferably, the torsion sensor is embedded in a coupling filler mechanically coupling the sensor with at least one of the at least three longitudinal structural elements of the cable. More preferably, the coupling filler mechanically couples the torsion sensor with the at least three longitudinal structural elements.

Preferably, the single-mode optical fibre of the fibre optic sensor is mechanically congruent to the least one of the at least three longitudinal structural elements of the electric cable. With "mechanical congruence" it is meant the capacity of two or more parts of moving or withstand a torque substantially as a whole. More preferably, the single-mode optical fibre is mechanically congruent with the at least three longitudinal structural elements. In a preferred embodiment, mechanical congruence is obtained by embedding the torsion sensor in a coupling filler.

Within the present description and appended claims, with "torsion" it is meant a condition of stress and deformation caused when one end of the cable is rotated (twisted) in one direction and the opposite end is fixed (or motionless) or is twisted at a different rate and/or in an opposite direction. Torsion may be caused also when a first longitudinal section of the cable length is twisted and a second longitudinal section is fixed or twisted at a different rate and/or in an opposite direction.

Within the present description and appended claims, the term "longitudinal structural element" indicates a component of the electric cable substantially longitudinally extending along the cable length. The longitudinal structural elements according to the present description and claims can contribute to the electric transport function of the cable as it will become clear from the following.

At least one of the at least three longitudinal structural elements of the electric cable is an electrically conductive core. Preferably, at least two of the at least three longitudinal structural elements of the electric cable are cores.

The term "electrically conductive core" indicates a component of the electric cable comprising at least one electrically conductive element, such as an electrical conductor and, typically, at least one insulating layer surrounding the electrical conductor. In the typical configurations, the electrical conductors comprise a plurality of stranded conductive wires.

Within the present description and appended claims, the term "mechanical coupling" indicates that the optic fibre sensor and the longitudinal structural element are associated one another in such a manner that deformations—at least the torsional deformation—applied to the longitudinal structural element are transmitted to the sensor in a substantial portion.

In the present description and claims, when referring to two optical signals having distinct states of polarisation (SOPs), it is meant that the Stokes vector representing, in the 3-dimensional Stokes space, a first SOP of a first signal is neither parallel nor anti-parallel to the Stokes vector representing a second SOP of a second signal. In particular, the angle between the Stokes vector representing the first SOP and the Stokes vector representing the second SOP is larger than 0° and smaller than 180°. Preferably, the angle subtended by the Stokes vectors representing two distinct SOPs is of from 30° to 150°.

According to another aspect consistent with the present disclosure, a method for manufacturing an electric cable is provided, the cable having a central longitudinal axis and comprising:
- at least three longitudinal structural elements, at least one of the at least three longitudinal structural elements being an electrically conductive core comprising an electrical conductor, and
- a torsion sensor comprising a single-mode optical fibre, said torsion sensor arranged substantially along the central longitudinal axis and being mechanically coupled with at least one of the at least three longitudinal structural elements, the method comprising forming the fibre optic torsion sensor by:
- pre-twisting the single-mode optical fibre with a twisting pitch having a first value and a twisting hand;
- coating the single-mode optical fibre with at least one protective layer;
- embedding the fibre optic torsion sensor in a coupling filler;
- mechanically coupling the coupling filler embedding the fibre optic torsion sensor to a longitudinal structural element, and
- stranding the longitudinal structural elements around the coupling filler with a stranding pitch having a second value substantially equal to the first value of the twisting pitch and a stranding hand opposite to the twisting hand whereby the electric cable has the single-mode optical fibre with a twisting pitch substantially equal to zero.

Preferably, coating the single-mode optical fibre comprises applying at least one of a tight buffer and a protective sheath.

Preferably, pre-twisting the optical fibre and coating the optical fibre can be carried out in any order.

Preferably, the twisting pitch and the stranding pitch have a first and second value of from 2 to 3 turns/meter.

Preferably, the electric cable has a circular outer cross section.

A further aspect consistent with the present disclosure relates to an electric cable having a central longitudinal axis and comprising:
- at least three longitudinal structural elements, at least one of the at least three longitudinal structural elements being an electrically conductive core comprising an electrical conductor, the longitudinal structural elements being stranded with a stranding pitch equal to or higher than 1 turn/m, and
- a torsion sensor comprising a single-mode optical fibre, said torsion sensor arranged substantially along the central longitudinal axis and being mechanically coupled with at least one of the at least three longitudinal structural elements, wherein the fibre optic sensor comprises a single-mode optical fibre twisted about the central longitudinal axis with a twisting pitch equal to or lower than less than 1 turn/m.

Preferably, the single-mode optical fibre of the cable of the present disclosure has a twisting pitch of substantially 0 turn/m.

Preferably, the longitudinal structural elements have a stranding pitch equal to or higher than 2 turns/m.

In some preferred embodiments, the torsion sensor is integrated in the cable and arranged so as to remain substantially undamaged by bending of the cable at the minimum bending radius thereof. In those embodiments, the torsion sensor is located within a bending neutral region extending longitudinally along the cable and having a transverse cross-section extending substantially symmetrically about a bending neutral axis of the cable, the bending neutral axis corresponding to the central longitudinal axis of the electric cable in case of round cables.

As used herein, the term "neutral region" is intended to describe a region around the cable bending neutral axis (i.e. the central axis in round cables) where the bending-induced elongations are minimal.

The method according to the present disclosure can be used to measure the cable torsion during installation of a cable or to carry out a programmed periodic check of the cable during operation, for example to predict the residual lifetime and/or to adjust misalignments of guiding rollers or of pulley and tender systems.

BRIEF DESCRIPTION OF THE DRAWINGS

The accompanying drawings, which are incorporated in and constitute a part of this specification, illustrate some embodiments and, together with the description, serve to explain the principles of the disclosed method. Drawings illustrating the embodiments are not-to-scale schematic representations.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein.

FIG. 2a is a schematic perspective view of a torsion sensor used in an exemplary disclosed electric cable.

FIG. 2b is a schematic cross-sectional view of the torsion sensor shown in FIG. 2a.

FIG. 7(a) is a graph showing two continuous curves representing the plane projections of the birefringence vector as a function of the longitudinal position z in the fibre, for two distinct input SOPs (solid line and dashed line).

FIG. 7(b) shows the rotational angle functions ψ(z) measured from the two curves of FIG. 7(a).

FIG. 8(a) shows exemplary group birefringence angle functions $\psi_k(z)$ obtained from a single-mode optical fibre according to an embodiment consistent with the present disclosure.

FIG. 8(b) show the difference functions $\Delta\psi_{k,j}(z)$ between each pair of angles $\psi_k(z)$ of FIG. 8(a).

FIG. 8(c) reports the average birefringence angle, φ(z), calculated from the group birefringence angle functions of FIG. 8(a) according to a procedure described in an embodiment consistent with the present disclosure.

DETAILED DESCRIPTION

Figure 1:
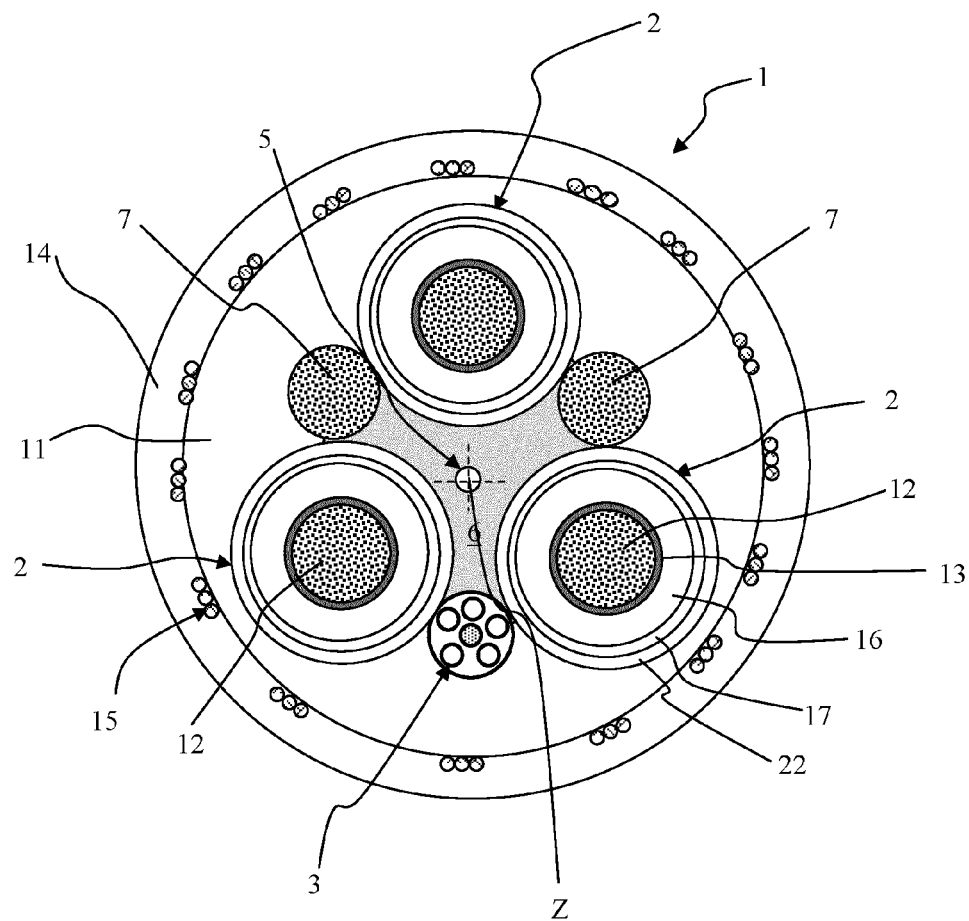
FIG. 1 is a schematic cross-sectional view of the electric cable according to an embodiment.

FIG. 1 illustrates a cross-sectional view of an electric cable, according to an exemplary disclosed embodiment. The cable shown of this embodiment can be suitable for heavy-duty applications, more particularly for mobile installations. Cable 1 is a round cable comprising three electrically conductive cores 2 (hereinafter also referred to as "core") radially arranged about a central longitudinal axis Z of the cable. The cores 2 can provide three-phase power transmission. Cable 1 can be a low or medium voltage power cable, where low voltage indicates a voltage of up to 1 kV and medium voltage indicates a voltage of from 1 kV to 60 kV. Each core 2 comprises an electrical conductor 12, for example a copper conductor formed by a bundle of tinned or bare copper electrical wires stranded together according to conventional methods. In radial external position with respect to each electrical conductor 12, an inner semi-conductive layer 13, an insulating layer 16, an outer semi-conductive layer 17 are sequentially provided. Inner semi-conductive layer 13, insulating layer 16 and outer semi-conductive layer 17 are made of polymeric-based materials that can be extruded one on top of the other or co-extruded onto the conductor 12. The insulating layer 16 can be for example of cross-linked ethylene propylene rubber (EPR); the inner and outer semi-conductive layers 12 and 17 can be, for example, of EPR, ethylene/propylene/diene terpolymers (EPDM) or a mixture thereof, charged with a suitable amount of a conductive filler, which can be typically carbon black.

Alternatively, whenever the operating conditions enable to do so, both the insulating layer and semiconductive layers can be made of thermoplastic compounds, such as polypropylene based compounds.

In some applications, the cable core 2 comprises at least one metallic screen layer 22 in a radially external position with respect to the outer semi-conductive layer 17.

It is to be understood that the above description of cores 2 represents only one of the possible structures of the cores comprised in the electric cable, which in general can be phase cores for power transmission or grounding, cores for carrying control signals or cores carrying both power and control signals.

According to a feature of the disclosure, electric cable 1 comprises a torsion sensor 5. The torsion sensor 5 is arranged substantially along the central longitudinal axis Z.

Given a minimum bending radius for an electric cable, which generally corresponds to the smallest radius of curvature, $\rho_{min}$, which is allowed for the cable in order to avoid any permanent damage, the neutral region can be defined as the region where the torsion sensor undergoes to an elongation not larger than 2%, and preferably not larger than 1%, due to the bending at radii of curvature not smaller than $\rho_{min}$. Positioning of the strain optical fibre within the neutral region prevents its rupture or permanent damage due to cable bending.

Preferably, the torsion sensor is disposed along the cable within a radial distance from the neutral axis of not more than $0.02\rho_{min}$ and more preferably of not more than $0.01\rho_{min}$.

In round cables such as that shown in FIG. 1, the central longitudinal axis corresponds to a symmetry axis of the radially external cores and/or, as described in the following, it is compatible with the cable manufacturing process.

Within the present description, the term "substantially" when referred to the arrangement of the torsion sensor along the central longitudinal axis means that the sensor is disposed within a neutral bending region surrounded and including the central longitudinal axis.

Cable bending can induce an elongation in the torsion sensor and thus in the single-mode optical fibre. The Applicant has realised that elongation of the single-mode optical fibre may determine a variation of the birefringence of the fibre and thus may affect the measured polarisation states of the light backscattered from the fibre.

If the torsion sensor is located within the cable in such a way that the single-mode optical fibre is not affected by bending of the cable to any radius of curvature being not smaller than the minimum radius of curvature, $\rho_{min}$, which corresponds to the minimum radius at which the cable can be bent without permanent damage, strain induced in the single-mode optical fibre by bending is minimised. By minimising the bending-induced strain of the single-mode optical fibre, accuracy in the measurements of the cable torsion can be improved.

The region of the cable extending along the cable length wherein the single-mode optical fibre remains undamaged due to cable bending is defined as the (bending) neutral region of the cable. In round cables, in a cross-sectional plane of the cable, the neutral region is a radial region about the neutral axis, which corresponds, in the present embodiment, to the central longitudinal axis Z.

Preferably, within the neutral region of the optical cable, the torsion sensor undergoes to an elongation equal to or lower than 2%, more preferably equal to or lower than 1%, due to the bending at $\rho_{min}$.

The Applicant has observed that the values of $\rho_{min}$ specified for heavy-duty cables, especially for applications in mobile equipments, can be relatively low, e.g., 250 mm, and thus, in order to guarantee bending resistance of the torsion sensor, the neutral region can have a relatively small radial distance from the central longitudinal axis, e.g., not greater than 5 mm. For example, always with reference to round cables, for $\rho_{min}=300$ mm, the radial distance in order to have 1% of elongation is of 3 mm.

In some preferred embodiments, the neutral region is disposed along the cable length within a distance from the central longitudinal axis (namely, the neutral axis) of not more than $0.02\rho_{enin}$ and preferably of not more than $0.01\rho_{min}$.

Further to cores 2 for transmission of power and/or control signals, the electric cable 1 can optionally comprise at least one earth conductor 7. In the embodiment shown in FIG. 1 the cable comprises two earth conductors 7, for example in form of a bundle of stranded tinned or bare copper electrical wires. Especially for medium-voltage applications, the bundle of electrical wires of the earth conductors can be surrounded by a semi-conductive layer (not shown in the figure). The earth conductors 7 are arranged radially external with respect to the torsion sensor 5 and are stranded together with the cores 2 along a cable longitudinal direction. Cores 2 and, when present, earth conductors 7, are helically wound about the central longitudinal axis Z of the cable and about the torsion sensor as it will better explained later in the description.

The electric cable can further comprise an optical fibre element 3 including a plurality of optical fibres, e.g., from 6 to 24 fibres, for transmission of control signals, voice, and other data signals. The optical fibre element 3 can be stranded together with the cores 2 and, when present, with earth conductors 7. Optionally, the cable can comprise a fibre optic temperature sensor. For example, the temperature sensor can be provided by a single optical fibre arranged in a loose-tube buffer construction in a longitudinally extending module of the optical fibre element 3, as described in WO 2010/136062.

Cores 2 and, if present, earth conductors 7 and/or the optical fibre element 3, are collectively referred to as the longitudinal structural elements of the electric cable.

The torsion sensor 5 is embedded in the cable in such a way that a torsion experienced by the cable is transferred to the single-mode optical fibre. To this end, the torsion sensor is preferably mechanically congruent with at least one of the at least three longitudinal structural elements in the cable in such a way that the torsion experienced by the least one longitudinal structural element is at least partially, but significantly, transferred to the torsion sensor. According to the preferred embodiments of the present disclosure, mechanical congruence is realised by providing the cable with a coupling filler 6 that mechanically couples the torsion sensor 5 with at least one longitudinal structural element of the electric cable. Preferably, the coupling filler mechanically couples the torsion sensor with each of the cores integrated in the electric cable, more preferably with each of the circumferentially arranged longitudinal structural elements.

In some preferred embodiments, in order to improve the correlation between the elongation of the torsion sensor and of that of the cable, the contact between coupling filler and at least one of the at least three longitudinal structural elements is such that no significant sliding losses occur. In many cases of interest, a substantial absence of sliding loss between sensor and element/s implies an adherence with friction or bonding between them. A mechanical coupling between two elements causing substantially the same deformation as a result of no significant sliding losses between the elements, is herein referred to as mechanical congruence.

From the geometrical construction of the electric cable and the number of longitudinal structural elements integrated in the cable, the coupling filler 6 of the cable of FIG. 1 has a shape approximately of a trefoil.

The coupling filler 6 is made of a material having elastic properties such to react to the maximum strain for which the cable exhibits an elastic behaviour without permanent deformation of the filler (i.e., reversibility of the deformation). The coupling filler material is selected to suitably stretch along the cable undergoing elongation and to substantially recover the deformation when the external tensile loads are removed, at least for tensile loads corresponding to the allowed maximum strain, beyond which a permanent and irreversible deformation of the cable takes place.

The coupling filler 6 can be based on a polymeric material, advantageously extruded around the torsion sensor 5. In some embodiments, thermosetting elastomers are selected as they are observed to adhere to the surfaces of the longitudinal structural elements. For example, it has been noted that thermosetting elastomers provide a suitable adhesion with the semi-conductive materials that typically surround the cores of some electric cables, while exhibiting a friction not detrimental for the semi-conductive external surface of the cores.

Advantageously, the material of the coupling filler is resistant to thermal treatments that may take place during cable manufacturing, such as during curing of the outer sheath of the electric cable, typically carried out at approximately 100-200° C.

Preferably, the coupling filler comprises a thermosetting elastomer cross-linked by means of steam pressure, irradiation with electron beam, salt bath dipping or silane cross-linking systems. In general, the coupling filler is preferably made of elastomers having an elastic modulus between 0.01 and 0.7 GPa. For example, the coupling filler is selected from the group consisting of ethylene propylene diene rubber (EPDM), ethylene propylene rubber (EPR), nitrile-butadiene rubber (NBR).

Although thermosetting elastomers are preferred because of their temperature resistance adhesion properties and large elasticity range, the use of thermoplastic elastomers is not excluded. Examples of thermoplastic elastomers include styrene-diene-styrene triblock copolymers; thermoplastic polyester elastomers and thermoplastic polyurethane elastomers; and thermoplastic polyolefin rubbers (polyolefin blends).

In some embodiments, the coupling filler 6 can be electrically conductive.

Interstitial areas 11 are filled with polymeric filler such as an EPR based compound. An outer jacket 14 is provided, for example by extrusion. To increase the resistance of the electric cable to mechanical stresses, the outer jacket 14 is preferably made of a cured polymeric material, preferably based on a reinforced heavy-duty thermosetting elastomer, such as high density polyethylene (HDPE), polychloroprene, polyurethane or NBR-based compound.

An armour 15 in form, for example, of braids or double spiral of reinforcing yarns, such as metal or polyester yarns, for instance made of Kevlar® (aromatic polyamide), can be provided.

Figures 2A, 2B:
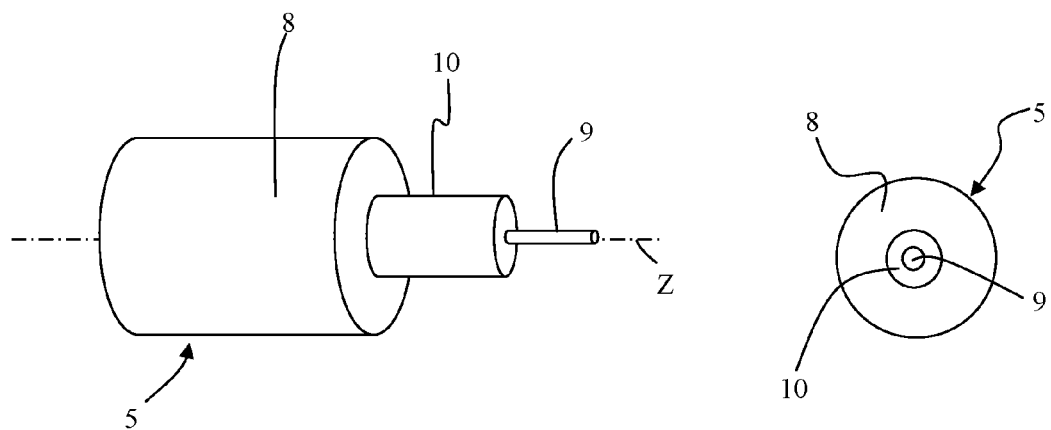

FIGS. 2a and 2b illustrate a partial perspective view and a cross-section, respectively, of a torsion sensor 5 integrated in the electric cable of FIG. 1, according to a preferred embodiment of the present disclosure. The torsion sensor 5 comprises a single-mode optical fibre 9 that is substantially arranged along the central longitudinal axis Z of the cable, when the torsion sensor is integrated in the cable. Fibre 9 of torsion sensor 5 is a silica-based optical fibre, with typical nominal diameter of 125 µm, coated by a coating system. In some embodiments, the optical fibre 9 is a single-mode transmission fibre compliant with G.652, G.653, or G.655 ITU-T (International Telecommunications Union, ITU Telecommunication Sector) recommendations.

Preferably, the single-mode optical fibre of the torsion sensor has enhanced bending performance, exhibiting low bending losses. In some embodiments, the optical fibre is compliant to the G.657 ITU-T recommendations.

In some embodiments, the coating system is formed by a primary coating, which is surrounded by a secondary coating, which typically adherently contacts the primary coating. The outer diameter of the (coated) optical fibre can be 250+/−10 µm or 200+/−10 µm.

Preferably, the single-mode optical fibre comprises a coating system formed by a single-coating layer which is disposed in contact with said outer glass portion (i.e. cladding) of the fibre. In a preferred embodiment, the single coating layer has a modulus of elasticity value between −40° C. and +60° C. comprised between 5 MPa and 600 MPa, as described in WO 04/031091.

In preferred embodiments, the optical fibre 9 is tight-buffered with a buffer layer 10 surrounding the coating system for improving mechanical protection of the optical fibre, e.g.

against microbending losses. Uniform adherence of the buffer layer to the optical fibre, namely to the coating system of the fibre, is particularly important for ensuring mechanical congruence between the optical fibre and the coupling filler.

For example, the buffer layer 10 is extruded or applied over the 250 μm-coated fibre, increasing the outside diameter up to 600-1000 μm, with typical values of 800-900 μm.

Preferably, the buffer layer is selected so as to adhere to the coating system of the optical fibre with essentially no creeping, slipping or debonding. Preferably, the buffer layer is based on a thermal resistant material capable of exhibiting thermal resistance sufficient to withstand the thermal treatments taking place during cable manufacturing.

Preferably, the buffer layer is made of a radiation curable acrylate polymer.

For example, the tight buffer is made of a UV-curable acrylate polymer such that described in WO 2005/035461, or of a polymeric matrix charged with a flame retardant filler such that described in WO 2008/037291.

An adhesion-promoting layer can be provided between the optical fibre coating system and the tight buffer layer.

Heavy duty cables are designed to bear lateral loads and tensile forces that compress the longitudinal structural elements inside the cables. In some circumstances, it is preferable if the torsion sensor remains substantially unaffected by lateral compressions of the cable, which, when affecting the single-mode optical fibre, may cause optical losses due to microbending. Furthermore, when the optical fibre of the torsion sensor is compressed, a local variation of birefringence can induce a polarization change greater than that induced by torsion to be measured.

In some preferred embodiments, the torsion sensor is shielded against lateral loads, which can give rise to microbending losses. Preferably, a protective sheath 8, designed to improve resistance to lateral compressions, can be advantageously provided to surround the optionally tight buffered optical fibre.

In round cables, such as that illustrated in FIG. 1, lateral compressions in directions transverse to the longitudinal cable direction, typically occur in radially inward directions.

Applicant has observed that the torsion sensor can be used as pulling strength member in the step of extrusion of the coupling filler during the cable manufacturing process. According to this embodiment, measures are preferably taken in order to avoid that the torsion sensor material does not soften during the extrusion process of the coupling filler, so that to guarantee a uniform pulling force. The presence of a protective sheath 8 and a suitable selection of the material forming said sheath can advantageously provide the torsion sensor with a tensional strength sufficient to both improve resistance to lateral compression and to allow the torsion sensor to function as pulling strength member in the manufacturing process of the electric cable.

In order to ensure mechanical congruence between the single-mode optical fibre and the coupling filler, the material of the protective sheath is selected so as to provide strong and relatively uniform adhesion with the optionally buffered optical fibre.

In preferred embodiments, the protective sheath 8 is made of a fibre-reinforced composite, wherein the fibres can be carbon, graphite, boron, or glass (non optical) fibres.

In an embodiment, the protective sheath 8 is a glass-reinforced polymer (GRP), in which the polymer is reinforced by glass fibres embedded in the polymer. It has been observed that relatively high tensional stiffness of the torsion sensor is achieved by the presence of reinforcing fibres deployed parallel to the optical fibre longitudinal axis, thereby easing the manufacturing of the cable when the torsion sensor is used as pulling strength member in the step of extrusion of the coupling filler. The protective sheath 8 can be pultruded onto the buffer layer 10 and is in direct contact thereto.

Optionally, the outer surface of the protective sheath, which is surrounded by the coupling filler in which the torsion sensor is embedded, comprises a plurality of grooves or cuts or is treated to form a rough surface in order to increase the adherence of the protective sheath with the coupling filler. Alternatively or in addition, an adhesion promoting layer can be optionally provided on the protective sheath.

In order to provide the torsion sensor with the required flexibility, it is preferred that the protective sheath is made of a polymeric-based material having elastic properties. Preferably, the polymer embedding the reinforcing fibres are cross-linked resins, in particular UV-curable cross linked resins or thermosetting cross linked resins, which in general provide for a resistance to compressions. The cross-linked resins can be unsaturated polyesters, epoxies, or vinyl esters.

It has been observed that, in order to improve flexibility of the torsion sensor, the thickness of the protective sheath, when made of polymeric-based material, is preferably comprised between 500 and 1000 μm. For example, the protective sheath is a GRP layer that increases the outer diameter of the buffered optical fibre up to 1.8-2.5 mm.

It is preferred that the protective sheath surrounding the optical fibre of the sensor prevents fibre shrinkage at temperatures used in the manufacturing process, and in particular in the curing process of some cable components, such as the inner and outer sheaths.

High-temperature grade cross-linked resins withstanding the curing temperature are selected, for example, high temperature Polystal® GRP by Polystal Composites GmbH.

Due to a proper selection of the materials of the torsion sensor and the coupling filler, which provide mechanical congruence between the different elements, an efficient transfer of the torque is achieved.

For example, the protective sheath of the torsion sensor is a fibre reinforced thermoplastic polymer having Young's modulus of 72,400 MPa, while the coupling filler is a thermosetting elastomer having Young's modulus of 671 MPa. The cross-sectional area of the protective sheath is of 3.4 mm$^2$ and the cross-sectional area of the coupling filler is of 75 mm$^2$, providing an axial rigidity of 250 kN for the protective sheath of and of 50 kN for the coupling filler. If a fibre reinforced thermoplastic polymer has a good adhesion to the coupling filler and to the underlying layers, such as the buffer layer, the thermoplastic polymer takes along the coupling filler, even if the cross-sectional area thereof is much smaller.

In an embodiment, the coupling filler is selected from the group consisting of: polyester with Young's modulus of from 1 to 5 GPa, polyamide with Young's modulus of from 2 to 4 GPa, polyvinyl chloride (PVC) with Young's modulus of from 0.003 to 0.01 GPa, low-density polyethylene with Young's modulus of from 0.1 to 0.3 GPa, and high-density polyethylene with Young's modulus of from 0.4 to 1.2 GPa. Preferably, cross-linked polymeric materials are employed.

According to another embodiment, in order to provide the torsion sensor with resistance to lateral loads and pulling strength, the protective sheath of the torsion sensor can be a metallic tube surrounding the buffer layer of the optionally buffered optical fibre (embodiment not shown in the figures). In this case, the metallic tube contains a gel or gel-like material, optionally under pressure, capable of providing the sought mechanical congruence between metallic tube and the optical fibre contained therein. In a preferred embodiment, the metallic tube is made of steel.

Preferably, only one in the group consisting of the buffer layer surrounding the coated fibre, the protective sheath and the coupling filler is made of a material with plastic properties.

Although in some preferred embodiments the torsion sensor comprises a buffer layer in order to improve strength and elasticity of the torsion sensor, as in the construction shown in FIGS. 2a and 2b, it is to be understood that the torsion sensor can comprise an optical fibre coated with a coating system directly surrounded by a protective sheath.

Figure 3:
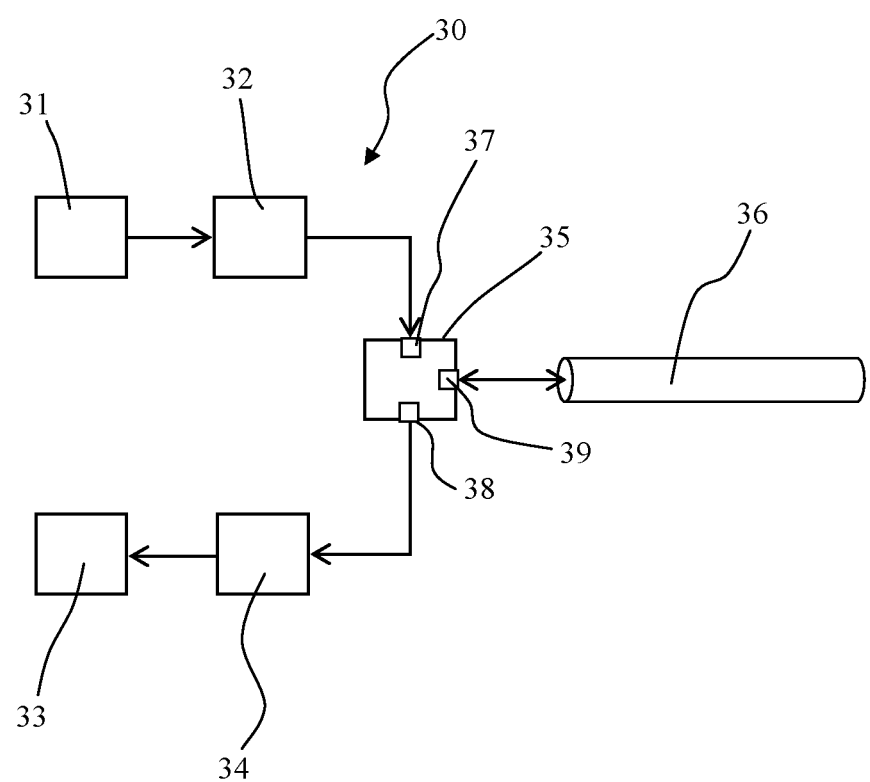
FIG. 3 is a schematic diagram for illustrating an apparatus of a polarisation-sensitive optical time-domain reflectometry technique in a method for monitoring the torsion according to an exemplary disclosed embodiment.

FIG. 3 is a schematic block diagram illustrating the operating principles of a measuring apparatus using the P-OTDR technique to measure the rotational changes over the cable length. A measuring apparatus 30 comprises a laser source 31 apt to generate an optical pulse, preferably with narrow bandwidth and more preferably with selectable duration. Time duration of the pulse is related to the longitudinal extension of the pulse along the sensing fibre and thus affects spatial resolution. Generally speaking, narrow pulses provide higher spatial resolution than broader pulses. However, since broader pulses provide a larger intensity than narrower pulses, in some embodiments, pulse duration is selected to balance the intensity of the optical pulse (taking into account the attenuation of the light while travelling in the fibre) and the desired spatial resolution.

For example, the laser source can be an external cavity laser (as the Yenista Tunics series) or a DFB laser diode, generating a pulse of time length of from 3 to 1000 ns. It is generally profitable that the laser line-width is less than few GHz, even more profitably less than few MHz. As it is generally known, the state of polarisation (SOP) of a propagating wave is the relation between the transverse components of the electric field in a fixed plane that moves in time with the wave along the propagation direction.

In a preferred embodiment, the optical pulse is generated by the laser source with one state of polarisation. The SOP of the optical pulse can be optionally changed by a polarisation controller device 32, optically coupled to the laser source 31.

In another embodiment, the laser source 31 is apt to generate an unpolarised optical pulse. A single SOP is then selected by a polarisation controller device 32 optically coupled to the laser source. For example, the polarisation controller is an Agilent 8169A or a Thorlab DPC5500 or a simpler mechanical polarization controller from FiberLogix.

In either embodiment, a probe input pulse with an input SOP is created. In case the measuring apparatus comprises a polarisation controller optically coupled to the laser source, a given input SOP corresponds to a given configuration of the polarization controller. The probe pulse then enters an optical splitter/combiner device 35 through a first input port 37 and it is then launched through a first output port 39 of the optical splitter/combiner into an input end of a sensing single optical fibre of a torsion sensor comprised in a cable 36 (torsion sensor not shown). The optical splitter/combiner device 35 can comprise an optical circulator, such as a three-port optical circulator. In an embodiment, the cable is an electric cable described with reference to FIG. 1. More generally, the cable 36 comprises at least three longitudinal elements and a torsion sensor comprising a single-mode optical fibre arranged substantially along a central axis of the cable, the fibre optic sensor being mechanically coupled to at least one of the at least three longitudinal structural elements.

The probe pulse having an input SOP travels along the single-mode optical fibre and Rayleigh backscattering takes place due to the refraction index fluctuations in the fibre.

The beam splitter/combiner 35 deviates the backscattered field from the single-mode optical fibre to a polarisation analyzer device 34. In the embodiment shown in the figure, the optical splitter/combiner is a three-port optical circulator and the backscattered field enters the first output port 38 of the circulator, which is an input/output port, to be deviated to a second output port 39 optically coupled to the polarisation analyser 34.

The polarization analyzer converts SOP variations of the backscattered field into power fluctuations. For example, the polarisation analyser comprises calibrated waveplates, polarization beam splitter and/or polarizing waveplates. The power fluctuations of the optical signal emerging from the polarization analyzer are recorded by an optical receiver 33, optically coupled to the polarisation analyser 34.

For example, the polarisation analyser is apt to measure the incoming signal on three polarisation states by analysing the components of the signal onto the three eigenvalues corresponding to the polarisation states, in a manner per se known.

Preferably, the optical receiver 33 is a photodiode which detects the backscattered power signal. For example, a suitable optical receiver is an avalanche photodiode (APD).

In some embodiments, it may be preferable to optically amplify the probe pulse and/or the backscattered signal, so to increase the signal to noise ratio (SNR) and the overall repeatability of the measurement. Optionally, spatial filtering of the probe pulse and/or the backscattered signal can be done by introducing a spatial optical filter downstream the polarisation controller and/or downstream the polarisation analyser.

The raw data, which are recorded by the optical receiver, i.e. power fluctuations of the backscattered field caused by the SOP variations, are downloaded in a central processing unit, comprised for example in a personal computer (not shown in the figure), where the evolution of the SOP of the backscattered field is calculated as a function of time by using algorithms per se known from standard polarimetry.

By knowing the refractive index of the single-mode optical fibre, i.e. the speed of the optical pulses within the fibre, it is possible to convert the time coordinate of the SOP of the backscattered field to a space coordinate and thus calculate the SOP as a function of the longitudinal position along the fibre where the scattering takes place, i.e. as a function of the distance from the scattering point. As the SOPs emitted from the sensing fibre are directly derived from reflectometry measurements, within the present description and claims, we will also refer to a "measured" SOP of the backscattered field, referred in the following also to as the output SOP.

In practice, many P-OTDR are set up so that, during measurements, the same probe signal having a predetermined input SOP is injected a large number of times, e.g. several hundreds, and the corresponding backscattered signals are detected. The backscattered optical signal for which an output SOP is measured is the average value of the detected optical signals. This improves the SNR of the measured output SOP. For example, some commercial P-OTDR reflectometers need about 1 minute to measure an output SOP for each input SOP.

The output SOP of the backscattered field is related to the input SOP via a mathematical relationship which provides information on the rotation of the birefringence axis of the probed fibre. Various methods can be used to calculate the rotation, such as the Müller Matrix Method described in R. M. Jopson et al. in *"Measurements of Second-Order Polarization-Mode Dispersion Vectors in Optical Fibers"*, published in IEEE Photonics Technology Letters, vol. 11 (1999), pages 1153-1155, who determined a 3×3 rotation matrix that relates the input SOP to the output SOP and that represents the round-trip propagation of the backscattered field.

To retrieve information on the distribution of the angle of birefringence of the single-mode optical fibre along the fibre length from the measured round-trip quantities can be achieved by using a known mathematical model and its algorithms.

As described in A. Galtarossa et al., "*Reflectometric measurement of birefringence rotation in single-mode fibers*", Optics Letters, vol. 33 (2008), pages 2284-2286, from the SOP of the backscattered field, directly derived from the measurements by means of polarization sensitive reflectometry, it is possible to calculate an "equivalent" birefringence vector, $\vec{v}_R(z)$, defined in Equation (4) of the cited article, where z is the distance from the scattering point to the fibre input end, along the fibre longitudinal axis. The vector $\vec{v}_R(z)$ derived from the measurements is directly correlated to the local birefringence vector $\vec{\beta}(z)$ of the sensing fibre and contains the information on the variation of the rotational state along the fibre length, which is represented by the local evolution of the linear component of $\vec{v}_R(z)$.

A mathematical representation of the equivalent birefringence vector, $\vec{v}_R(z)$, is in the 3-dimensional Stokes space with $\{\vec{s}_1, \vec{s}_2, \vec{s}_3\}$ being the orthonormal basis of the space, where the unit vectors $\vec{s}_1$, $\vec{s}_2$ and $\vec{s}_3$ correspond to horizontal linear polarization, 45° linear polarization and right-handed circular polarization, respectively. The longitudinal coordinate z maps the sampling points along the fibre.

The equivalent birefringence vector $\vec{v}_R(z)$ is linear by definition (i.e. its third component is zero) and it is rotated by an angle $\psi(z)$ with respect to $\vec{s}_1$. The angle function $\psi(z)$ subtended by $\vec{v}_R(z)$ and the vector $\vec{s}_1$, which represents the projection of the fibre birefringence vector in a plane perpendicular to the circular polarization axis, can be expressed as $$\psi(z) = \eta(z) + (2-g)\theta(z), \quad (1)$$

where $\eta(z)$ is the intrinsic orientation of the fibre birefringence, $g \approx 0.15$ is an elasto-optic coefficient known in literature, and $\theta(z)$ is the rotational angle function representing the angle by which the fibre is physically twisted in z. In the following, $\psi(z)$, which can be directly derived through known algorithms from reflectometry measurements and which represents the angle of rotation of the fibre birefringence (equivalent) vector, is referred to as the birefringence angle function.

Since the angle $\eta(z)$ is independent of the rotation $\theta(z)$ applied to the fibre, once the intrinsic orientation of the birefringence of the sensing fibre in z is known, the term $\eta(z)$ can be taken as a constant function and the physical rotation $\theta(z)$ be directly calculated from the values of $\psi(z)$ derived from the measurements of the detected backscattering field.

To determine the equivalent birefringence vector and thus to calculate the rotational angle function, at least two measurements of the output SOP of the backscattered field, corresponding to two distinct input SOPs of the probe field, are performed. The detection of at least two backscattered signals, corresponding to two probe signals with different polarizations, allows the measurement of three degree of freedom necessary to define the rotation of the birefringence vector and thus the determination of the birefringence angle function.

If, for example, a number n of turns is applied to the fibre, the birefringence angle function can be expressed as $$\psi_n(z) = \eta(z) + (2-g)2\pi n \frac{z}{L}, \quad (2)$$

where L is the length of the twisted fibre section. Once the intrinsic contribution $\eta(z)$ is known, it is possible from the birefringence angle function $\psi_n(z)$ to calculate the number of turns applied to the fibre and more generally the physical rotation of the fibre.

As the single-mode optical fibre, and thus the torsion sensor, is mechanically coupled to at least one longitudinal element of the cable embedding the sensor, the twist determined along the single-mode optical fibre is directly correlated to the torsion of the cable. Therefore, the determined rotational state of the sensing fibre is associated to torsional state of the cable.

The effect of the external twist of the fibre, and thus of the torsion of the cable, can be highlighted by calculating the variation of the birefringence angle function with respect to a reference curve. The reference curve may represent an initial condition of the cable, such as when the cable is installed as heavy duty cable in a crane or wound around a reel for mobile installations.

From relation (1), the variation of the rotational angle function is given by $$\Delta\theta(z) = \frac{\psi(z) - \psi_0(z)}{2-g} = \theta(z) - \theta_0(z) \quad (3)$$

where $\psi_0(z) = \eta(z) + (2-g)\theta_0(z)$ is the reference curve, for example an initial birefringence angle distribution along the fibre length z corresponding to the initial condition of the cable. Equation (3) directly provides the variation of the twist applied to the cable as a function of the length along the cable.

It is noted that relative measurements of the variation of the rotational state of the cable, which refer to a reference condition of the cable, do not need the knowledge of the intrinsic orientation of the fibre birefringence, since it is independent of the rotational state applied to the fibre.

In practice and according to an embodiment, the variation of the rotational angle function $\Delta\theta(z)$, which represents the variation of the twist applied to the cable with respect to a reference condition described by a reference angle function $\psi_0(z)$, is determined by executing the following steps: preparing a reference birefringence angle function; detecting a plurality of backscattered optical signals following injection of a corresponding plurality of probe optical signals to measure an output SOP for each of the plurality of backscattered optical signals; from the measured output SOPs, calculating an equivalent birefringence vector $\vec{v}_R(z)$; calculating a birefringence angle function $\psi(z)$ subtended by $\vec{v}_R(z)$ and $\vec{s}_1$, and calculating the variation of the rotational angle function from the birefringence angle function $\psi(z)$ and the reference birefringence angle function, the variation of the rotational angle function representing the mechanical twist of the fibre around its longitudinal axis. Preparing a reference angle function can be performed by deriving the reference angle function from reflectometry measurements as described above.

When a number n of turns are applied to the fibre, using (2) and (3) the variation of the fibre rotational angle function can be expressed as $$\Delta \vartheta_n(z) = \frac{\psi_n(z) - \psi_0(z)}{2 - g} = 2\pi n \frac{z}{L} \quad (4)$$

where $\psi_0(z)=\eta(z)$ is the reference curve, for example corresponding to the initial condition of the cable when no turns are applied.

More generally, by means of Eq. (3), non uniform rotations or twists along the cable can be detected.

Figure 4:
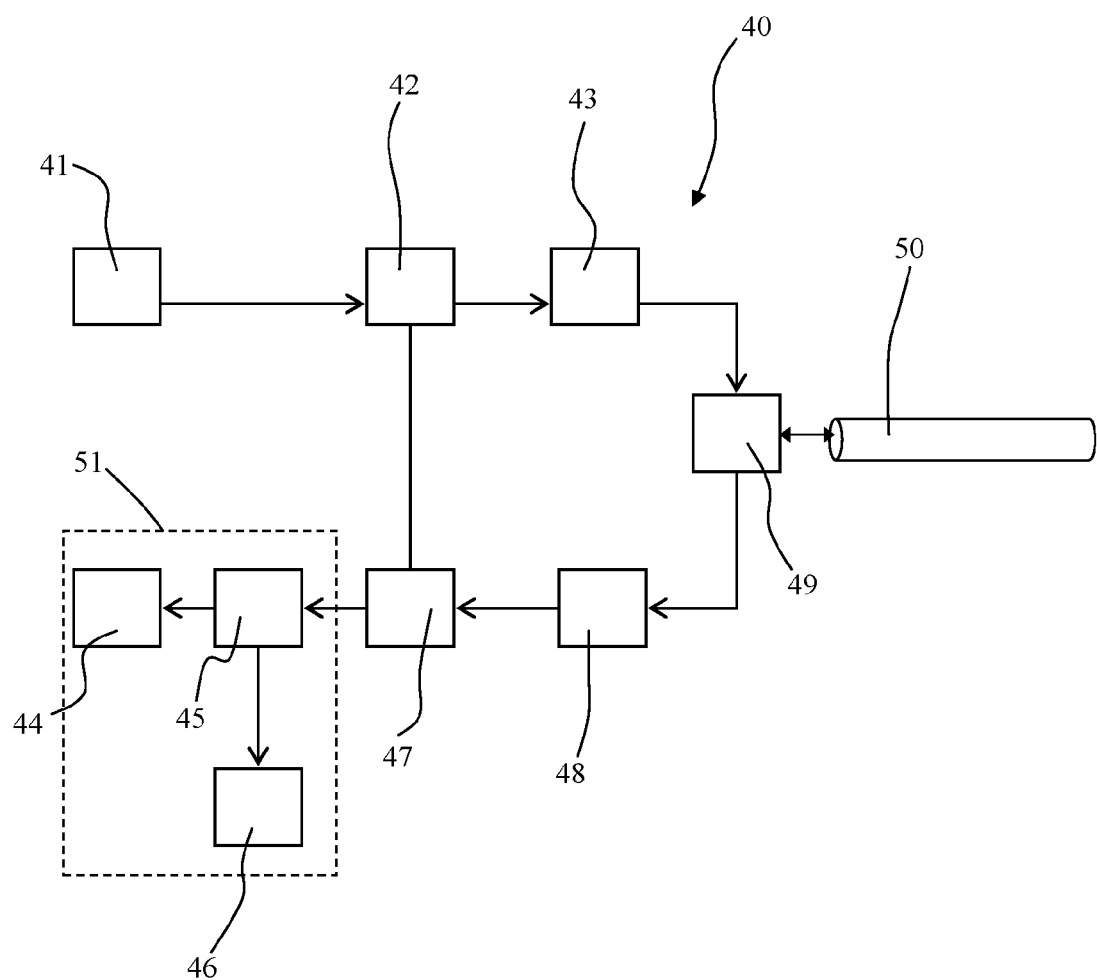
FIG. 4 is a schematic diagram for illustrating an apparatus of a polarisation-sensitive optical frequency-domain reflectometry technique in a method for monitoring the torsion according to an exemplary disclosed embodiment.

FIG. 4 is a schematic block diagram illustrating the operating principles of a measuring apparatus using the P-OFDR technique to measure the rotational changes over the cable length, in an embodiment consistent with the present disclosure. A measuring apparatus 40 comprises an optical laser source 41 apt to generate a highly-coherent continuous wave (CW) polarised optical signal, whose frequency is linearly varied in a given bandwidth. For example, the laser source is an external cavity laser having a frequency within the band where the sensing fibre is single mode, e.g. between 1300 and 1630 nm. The optical signal generated by the laser source 41 is split in two portions by means of an optical divider 42 optically coupled to the laser source. One portion of the optical signal is sent to a polarization controller 43 and acts as a probe signal, while the other portion is sent to an optical coupler 47 and acts as the local oscillator for a heterodyne detection scheme, as described in the following.

The probe signal is passed through the polarization controller 43, which selects and/or controls an input SOP for the probe signal. Therefore, at the output of the polarisation controller a probe signal with an SOP is created. The polarisation controller is optically coupled to a beam splitter/combiner 49, which injects the polarised probe signal to a single-mode optical fibre of a torsion sensor (not shown) integrated in a cable 50. In an embodiment, cable 50 is an electric cable as that described with reference to FIG. 1. More generally, the cable 36 comprises at least one longitudinal element and a torsion fibre optic sensor comprising a single-mode optical fibre arranged substantially along a central axis of the cable, the fibre optic sensor being mechanically coupled to the at least one longitudinal element.

The optical beam splitter/combiner 49 can be implemented with an optical circulator, such as a three-port optical circulator.

The beam splitter/combiner 49 receives the backscattered field from the single-mode optical fibre of the torsion sensor of cable 50 and deviates it to a polarisation analyser 48, which converts the SOP variations of the backscattered field in power fluctuations. For example, the polarisation analyser comprises calibrated waveplates, a polarization beam splitter and/or polarising waveplates. The polarisation analyser 48 is optically coupled to an optical coupler 47, which receives the optical signal containing the information on the local birefringence of the single-mode optical fibre. In the optical coupler 47, the polarised optical signal emerging from the polarisation analyser is mixed with the local oscillator, i.e. with the optical signal generated by the laser source, and the mixed signal is detected by a heterodyne detection device 51. The detection device comprises a polarisation optical divider 45 that splits the mixed optical signal received by the optical coupler 47 into two portions. A first portion of the mixed optical signal is sent to a first optical receiver 44 and a second portion of the mixed signal is sent to a second optical receiver 46, according to a heterodyne configuration.

By using known algorithms for heterodyne detection in P-OFDR, for example by exploiting the algorithm described in B. J. Soller, D. K. Gifford, M. S. Wolfe, M. E. Froggatt, "High resolution optical frequency domain reflectometry for characterization of components and assemblies", Optics Express, 2005, vol. 13, no. 2, pp. 666-674, it is possible to calculate the power fluctuations of the signal transmitted by the polarization analyzer 48 and detected by the receivers 44 and 46. The backscattered power fluctuations are taken for a given input SOP, which corresponds to a given configuration of the polarization controller 43.

By using a P-OFDR technique, the electrical signals generated by the optical receivers 44 and 46 are frequency modulated signals. An inverse Fourier transform of the frequency modulated signal converts the signal from a frequency domain into a time domain by providing, by means of known algorithms, an output SOP of the backscattered field as a function of time.

Many commercial P-OFDR can be set so that, during measurements, a probe optical signal with a predetermined input SOP is injected and then an output SOP is measured from the backscattered optical signal. Measurement of the backscattered spectrum may last few seconds. Processing of the backscattered spectrum may take place after acquisition of each backscattered spectrum. When acquisition of the backscattered spectrum has ended, it is possible to inject another probe optical signal.

By knowing the refractive index of the single-mode optical fibre, i.e. the speed of the optical pulses within the fibre, it is possible to calculate the SOP of the backscattered field as a function of the position along the fibre where the scattering takes place, i.e. as a function of the distance from the scattering point. Thus, a distribution of the angle of birefringence of the single-mode optical fibre, i.e. the birefringence angle function $\psi(z)$, can be obtained. Equations (1)-(4) hold also in case of measurements using the P-OFDR technique.

In some embodiments, it may be preferable to optically amplify the probe signal and/or the backscattered signal, so to increase the SNR and the overall repeatability of the measurement.

In another embodiment of the P-OFDR measuring apparatus, it is possible to omit the polarization analyser and calculate the SOP of the backscattered field as explained in R. Calvani, R. Caponi, F. Cisternino, "Real-time heterodyne fiber polarimetry with narrow-and broad-band sources", J. Lightwave Technol., 1986, vol. 4, pp. 877-883, using the complex signals recorded by the two optical receivers. In this embodiment and with reference to FIG. 4, the polarisation analyser 48 is omitted and the optical signal backscattered from the single-mode optical fibre is directed from the beam splitter/combiner 49 to the optical coupler 47 to be detected by optical receivers 44 and 46.

As described above, both the P-OTDR and the P-OFDR allow the calculation of a birefringence angle function of the single-mode optical fibre of the torsion sensor, as a function of the position along the fibre. From the determination of the birefringence angle function, the torsion applied to the cable integrating the torsion sensor is determined.

Figure 5:
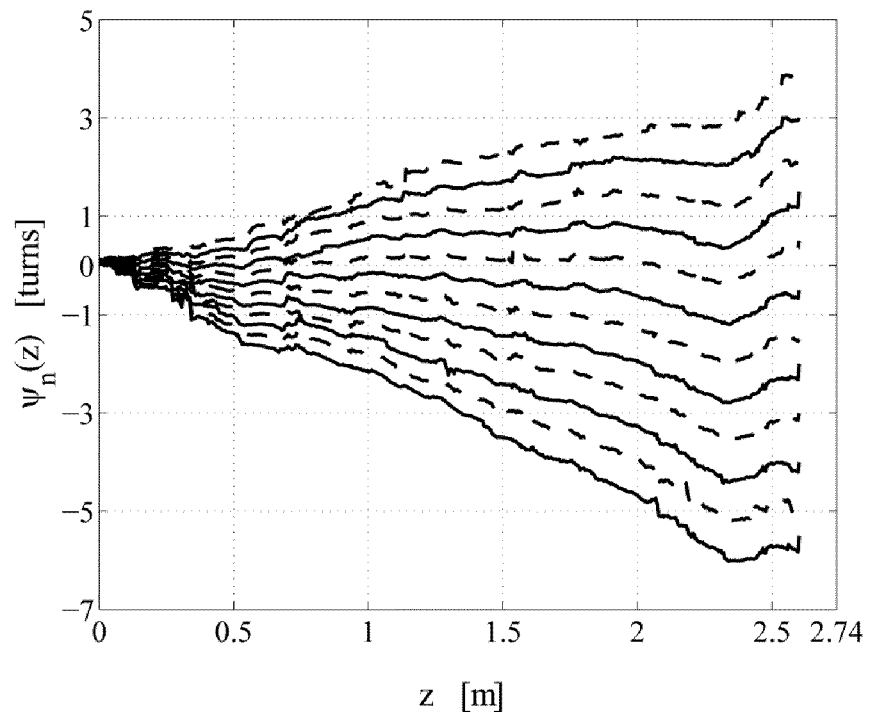
FIG. 5 is a graph showing the birefringence angle (measured in multiples of $2\pi$, i.e. measured in integer numbers of turns) as a function of distance z (meters) from the input of a single-mode optical fibre (z=0) of a torsion sensor surrounded by a coupling filler (i.e. a sensor-coupling filler assembly), derived from measurements taken with a measuring apparatus using the P-OFDR technique.

FIG. 5 is a graph showing the birefringence angle (turns) as a function of distance z (meters) from the input of a single-mode optical fibre (z=0) of a torsion sensor surrounded by a coupling filler, i.e. a sensor-coupling filler assembly, for different number of turns from 0 to 11 turns induced onto the fibre. Measurements were taken with a measuring apparatus using the P-OFDR technique. The torsion sensor comprised the sensing fibre, buffered with a UV crosslinked acrylate buffer 900 µm thick and surrounded by a glass reinforced polymer (GRP layer) and a coupling filler of thermoplastic elastomeric material. Such an assembly formed by a torsion sensor and a coupling filler can be used as cradle separator for an electric cable. The input end of the sensing fibre, i.e. the end at which the P-OFDR measuring apparatus was connected for the measurements, was fixed and the other end was rotated by a known number of turns. In the example, length section of the sensing fibre that underwent to rotation was of 2.74 m. Each of the curves of the graph of FIG. 5 can be described by Eq. (2). The lowermost curve of the graph is related to the fibre with no applied twist, whereas the uppermost curve corresponds to the fibre rotated for 11 turns. The lowermost curve shows a negative birefringence angle. This is due to an intrinsic rotation (i.e. pre-twist) of −2.1 turns/meters of the fibre inside the filler.

Figure 6:
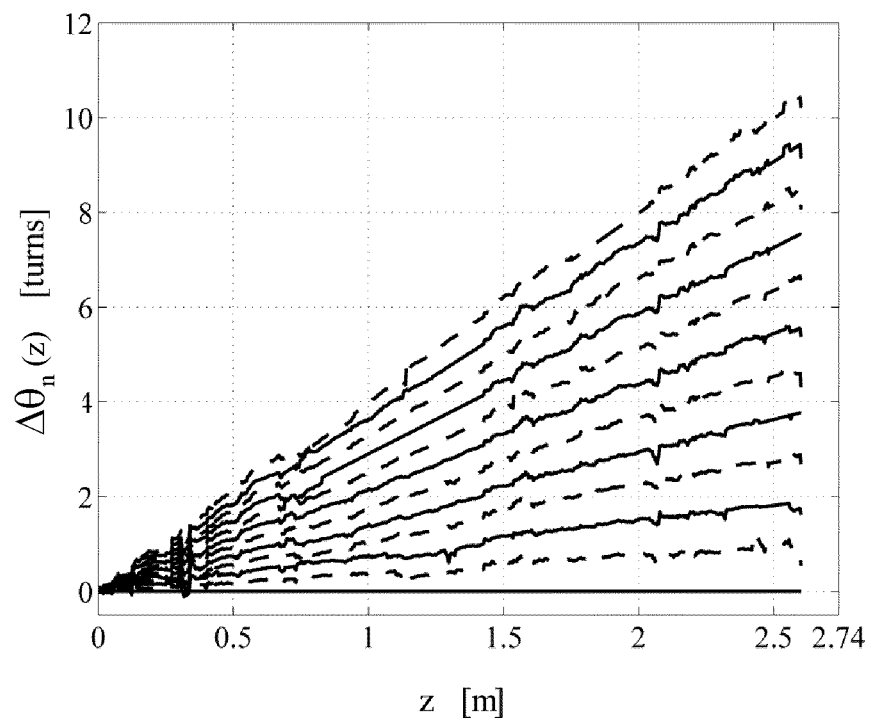
FIG. 6 reports the variation (turns) of the rotational angle as a function of distance z (meters) from the input of the single-mode optical fibre of the sensor-coupling filler assembly of FIG. 5.

FIG. 6 is a graph reporting the variation (turns) of the rotational angle as a function of distance z (meters) from the input of the single-mode optical fibre comprised in the sensor-coupling filler assembly of the example of FIG. 5. The variation of the birefringence angle is calculated using Eq. (4), where the lowermost curve is the reference curve with no applied external twist.

With reference to the above discussion, at least two measurements of the output SOP of the backscattered field, corresponding to two distinct input SOPs of the probe field, are necessary to determine the rotation of the birefringence vector.

When the amount of the measured output SOPs is larger than two, best fitting algorithms can be used to calculate the rotation that relates the output SOPs to the input SOPs. In an embodiment, the best fitting procedure described in "*Analysis of 3-D Rotation Fitting*" by K. Kanatani, IEEE Transactions of Pattern Analysis and Machine Intelligence, vol. 16 (1994), pages 543-549, is used to calculate a round-trip Müller matrix. From the rotation matrix, an equivalent birefringence vector is calculated as described above.

Since polarization is sensitive to cable movement the measurement is taken only when the cable is relatively still. Comparing torsion readings along the cable at different times it is possible to adjust guiding rollers that take the cable from the ground to the reel.

Calculated angle values $\psi(z)$ of the equivalent birefringence vector are provided in modulo $2\pi$, as any angle is undistinguishable from angles obtained by summing a multiple of $2\pi$ to the angle. In practice this means that the measured rotation angles $\theta(z)$ may exhibit abrupt jumps of $2\pi/(2\text{-}g)$, which however do not correspond to real abrupt rotation of the fibre.

A solution to this problem resides in unwrapping the angle $\psi(z)$ as a function of longitudinal position, i.e. to correct the evolution of the angle as a function of longitudinal position by modifying the values of the angle in order to remove abrupt changes or discontinuities of the angle, which are unlikely to take place in the real fibre. Common mathematical smoothing procedures are available in commercial mathematical software like MATLAB®.

The Applicant has observed that the procedures of unwrapping the angle in some circumstances may fail. A typical situation is represented in FIG. 7(a) that shows two continuous curves representing the equivalent birefringence vector $\vec{v}_R(z)$ in a Stokes plane $\{s_1, s_2\}$, for two different input SOPs (solid line and dashed line). In some sections of the sensing fibre, such as the section marked "A" in FIG. 7(a), the equivalent birefringence vector is small and hence close to the origin. Within this fibre section, noise in the measurements may easily cause the equivalent birefringence vector to pass on the other side of plane origin, as shown by the dashed curve that passes from the upper half-plane to the lower half-plane and back to the upper half-plane. When this situation occurs, the birefringence angle $\psi(z)$ derived from measurements has an anomalous abrupt variation of $2\pi$. FIG. 7(b) shows the angle functions $\psi(z)$ as a function of the longitudinal position z in the fibre, measured from the two curves of FIG. 7(a). It can be observed that the measurement most affected by noise (dashed curve) has an abrupt step variation, i.e. a discontinuity.

The Applicant has observed that an angle jump, such as that shown by the dashed curve of FIG. 7(b), cannot be compensated by using an unwrapping procedure, for the $2\pi$ step does not occur suddenly from a measurement of a output SOP to the next measurement, but it is present within the same measurements across a plurality of sampling points of the output SOP.

The Applicant has also observed that in some circumstances the steps may be larger than $2\pi$ and being generally $2\pi m$, with m being an integer number. Hereinafter we refer to these artifacts as "$2\pi$-jumps", regardless of their effective amplitude.

In principle, a single-mode optical fibre can be preferably selected with a sufficiently uniform and high birefringence (compatibly with the resolution of the reflectometer), so as to minimize the occurrence of the problem of abrupt step variations in the measured angle. However, due to external perturbations (e.g. mechanical and temperature variations of the cable in use) which act on the sensing fibre, it is difficult, at least in some circumstances, to avoid measurement artefacts such as those shown in FIG. 7(b).

The Applicant has understood that if the output SOP of a single-mode optical fibre is measured a number N of times equal to or larger than 3 and the N measurements are grouped in a number G of different groups, each group comprising a plurality of at least two measurements and being distinct from the other (G−1) groups by at least one measurement of the plurality of measurements, the analysis of the comparison between birefringence angle functions calculated for each of the groups makes possible to reveal and then correct the angle jumps.

For each group, the equivalent birefringence vector is calculated as described above. This results in a number G of estimated values of the equivalent birefringence vector and, from those values, the birefringence angle functions, $\psi_j(z)$, with $j=1, 2, \ldots, G$, hereafter referred also to as group birefringence angle functions, are calculated.

In absence of measurement artefacts due to "$2\pi$-jumps", the calculated $\psi_j(z)$ should be substantially identical for each group, but for possible slight differences caused by experimental noise. However, when the estimated rotational angles are affected by anomalous abrupt variations, at least two calculated functions $\psi_k(z)$ and $\psi_j(z)$, with $k \neq j$, differ from one another. Upon comparing the group angle functions $\psi_j(z)$ calculated for each group, it is possible to detect the measurement artefacts.

According to a preferred embodiment, the difference functions $\Delta\psi_{k,j}(z)=\psi_k(z)-\psi_j(z)$, for any combination of two angles, with $k,j=1, 2, \ldots G$ and $k \neq j$, are determined and analysed in order to detect jumps of amplitude close to $2\pi$. Within the groups, there are $G(G-1)/2$ combinations. The angle difference functions $\Delta\psi_{k,j}(z)$ should be substantially zero in the absence of discontinuities and thus any difference significantly different from zero is attributed to $2\pi m$ jumps. In some embodiments, a discontinuity d is defined to be present if the modulus of the angle difference function is equal to or larger than $\pi$. The discontinuity d is attributed to a $2\pi m$ jump, where m is the integer that minimizes the quantity $|d-2\pi m|$.

The detection of the "$2\pi$-jumps" in the curves $\Delta\psi_{k,j}(z)$ can be performed using edge-detection algorithms, per se known, commonly used in computer graphics and image processing. In an embodiment, the edge-detection algorithm is that described in J. Canny, "*A Computational Approach to Edge Detection*", published in IEEE Transactions on Pattern Analysis and Machine Intelligence, 1986, PAMI-8, vol. 6, pp. 679-698, and it is based on the first derivative of a Gaussian filter.

Once a "$2\pi$-jump" has been detected in the difference function $\Delta\psi_{k,j}(z)$, it is determined whether the jump actually occurred in $\psi_k(z)$ or in $\psi_j(z)$. This can be done by analyzing the smoothness of the two curves $\psi_k(z)$ and $\psi_j(z)$ in a length region around and comprising the position of the detected jump. The function describing the rotational angle with the anomalous jump will appear to be the least smooth of the two functions.

According to an embodiment, curves $\psi_k(z)$ are fitted with a roughness parameter in a ranges of z values around the points z affected by the jump, in order to determine which of the two curves $\psi_k(z)$ and $\psi_j(z)$ having $\Delta\psi_{k,j}(z)\neq 0$ is the least smooth, or in other words which of the two curves exhibits the highest roughness parameter around of the jump. A discontinuity length region is defined as a length region along the longitudinal axis z around and comprising the discontinuity representing a "$2\pi$-jump".

In the measurement of the output SOP as a function of time, which is then converted in an output SOP as a function of the fibre longitudinal position, the longitudinal axis z is actually sampled, with a sampling length, $\delta z_n$, which depends on the characteristic of the polarization sensitive reflectometer used to perform the measurement.

Let $z_h$ be the position of one of the "$2\pi$-jumps" detected in $\Delta\psi_{k,j}(z)$, and let $q_k(z)$ be a polynomial function that best fits $\psi_k(z)$ in a least-square sense, for z within the discontinuity length region, which is represented by the set $\{z_{h-s}, z_{h-s+1}, z_{h+s}\}$, with s being a positive integer and (2s+1) representing the number of longitudinal positions around the jump considered in the fitting procedure. Preferably, the polynomial function $q_k(z)$ is of first degree, more preferably of a second degree. Preferably, the positive integer s is of from 5 to 50.

A roughness parameter $\rho_k(z_h)$ for $\psi_k(z)$ in $z=z_h$ is defined as the residual $$\rho_k(z_h) = \sqrt{\sum_{i=-s}^{s} [\psi_k(z_{h+i}) - q_k(z_{h+i})]^2} . \quad (5)$$

If $\rho_k(z_h) > \rho_j(z_h)$, then $\psi_j(z)$ is smoother than $\psi_k(z)$ in the selected around of $z_h$. In that case, $\psi_k(z)$ is assumed to be affected by an anomalous jump in $z_h$.

To compensate for the artefact in $\psi_k(z)$, an offset $\pm 2\pi m$ can be added to $\psi_k(z)$ for every $z \geq z_{h+s}$. The sign of the offset should + if the "$2\pi$-jump" of $\Delta\psi_{k,j}(z)$ is decreasing with increasing of $z_h$, whereas it should be − if the "$2\pi$-jump" is increasing in $z_h$.

The Applicant has observed that very often the transition to the jump cannot be compensated by the addition of an offset. According to an embodiment, the discontinuity length region from $z_{h-s}$ to $z_{h+s}$ of $\psi_k(z)$ is marked as "unreliable" and is not taken into account in the calculation of an average rotational angle function, as described in the following. The procedure of calculating the roughness parameter is repeated for each difference $\Delta\psi_{k,j}(z)$, possibly analyzing each difference more than once, until no jumps are found. The analysis procedure provides G estimates of the function of the angle of birefringence, $\psi_k(z)$. Among the analysed functions, longitudinal samples corresponding to respective discontinuity length regions of one or more functions $\psi_k(z)$ are marked as "unreliable".

As a final step, a best estimate of the birefringence angle, $\phi(z)$, is calculated as follows: for each sample $z_n$, $\phi(z_n)$ is set equal to the mean value over k of $\psi_k(z_n)$, where the average is limited to samples (i.e. portions in z of birefringence angle functions) not marked as "unreliable". Finally, the variation of the fiber rotational function $\Delta\theta(z)$ with respect to a reference condition $\phi_0(z)$ is determined as $[\phi(z)-\phi_0(z)]/(2-g)$ by using Eq. (3), where $\phi_0(z)$ is a best estimate of the reference birefringence angle function obtained at the reference condition.

In some circumstances, the selection of a suitable number N of different input SOPs, and thus of N measured output SOPs, depends on a compromise between result accuracy and measurement time. Preferably, $3 \leq N \leq 7$, more preferably $3 \leq N \leq 5$.

In general, the higher the measurement noise, the larger should be preferably the number N. In a preferred embodiment, the G groups are formed as the N(N−1)/2 combinations of the N measurements taken (N−2) at a time without repetitions. More preferably, the G groups are formed as the N combinations of the N measurements taken (N−1) at a time without repetitions.

FIG. 8(a) shows exemplary birefringence angle functions $\psi_k(z)$ measured on a single-mode optical fibre using a number N=3 of different input SOPs, and grouping the corresponding data in G=3 groups of 2 measurements each. Each group determines one of the three birefringence angle functions $\psi_k(z)$ shown in FIG. 8(a). FIG. 8(b) shows the difference functions $\Delta\psi_{k,j}(z)$ between each couple of angles $\psi_k(z)$; the "$2\pi$-jumps" are clearly visible. FIG. 8(c) shows the (average) birefringence angle function, $\phi(z)$, calculated according to the procedure described above.

In the cable of the present disclosure and according to the preferred embodiments, the longitudinal structural elements are stranded around a common axis, which is the central longitudinal axis of the cable. Stranding of the longitudinal structural elements can be realised by helically winding the structural elements around the central axis or by stranding in a SZ pattern. As the torsion sensor is arranged substantially along the central axis, stranding is performed around the torsion sensor.

In some preferred embodiments, a manufacturing process comprises co-extruding the coupling filler onto the torsion sensor, possibly surrounded by a reinforcing filler, so that the coupling filler adheres to the outer surface of the torsion sensor. Then, the assembly formed by the torsion sensor and the coupling filler is inserted centrally with respect to the bundle of the longitudinal elements while the latter are stranded around the assembly. At the end of the stranding process, the longitudinal elements are helically wound around and in close contact with the coupling filler.

In one embodiment, the torsion sensor—and the single-mode optical fibre contained therein—has a twisting pitch and a hand (i.e. a direction of lay), referred to as the twisting hand, which are substantially the same as the stranding pitch and the stranding hand of the structural longitudinal elements.

The Applicant has observed that some measuring apparatuses using polarisation-sensitive reflectometry have a limit on the maximum value of variation of the angle of birefringence, $\Delta\theta_n(z)$ [Eq. (4)], which can be determined by the technique. The presence at the outset of a twist in the single-mode optical fibre without application of external torques acts as a non-zero baseline for measurements of an externally induced twist of fibre in the same direction as that of the winding process. A twist in the optical fibre at the outset can reduce the detectable maximum number of rotations applied to the cable in the same direction of that of the winding twist.

For the monitoring of the torsional state of a cable according to the present disclosure it is preferable to know the starting optical fibre torsion or twist, where as "starting" it can be meant the optical fibre twist at the cable laying before deployment or at the manufacturing plant before putting the cable on a bobbin. More preferably the single-mode optical fibre has a twisting pitch equal to or lower than 1 turn/m.

The Applicant has realised that if the torsion sensor is integrated in the cable with a single-mode optical fibre pre-twisted in the opposite hand of the twist that is planned to be applied during stranding of the longitudinal structural elements of the cable, the maximum value of variation of the angle of birefringence can be increased and thus the range of measurable number of cable rotations can be widened.

According to an embodiment, during the manufacturing process of the cable, the single-mode optical fibre is pre-twisted at a twisting pitch having substantially the same value of a pitch which will be applied to the structural longitudinal elements at the stranding step thereof (stranding pitch), and with opposite hand with respect to that of the longitudinal elements. The operation of imparting said twisting pitch to the single-mode optical fibre is referred to as "pre-twisting".

The pre-twisting of the single-mode optical fibre can be carried out at different manufacturing steps preceding the mechanical coupling of the optical fibre embedded into the coupling filler to the longitudinal elements. For example the twisting pitch can be imparted at the optical fibre before or after the application of tight buffer and/or protective sheath (coating step).

The pre-twisting can be performed to the optical fibre, before or after the application of tight buffer and/or protective sheath, using a twist apparatus as in WO2004/028989.

Preferably, the twisting pitch can be imparted to the optical fibre, before or after the application of tight buffer and/or protective sheath, by winding on a bobbin having circumference substantially equal to twisting pitch to be imparted, and extracting the fibre from a direction parallel to the bobbin axis without rotating the bobbin. This impart to the fibre one turn of twist for each length substantially equal to the bobbin circumference.

For example, the twisting pitch is of from 2 to 3 turns/meter.

The pre-twisted optical fibre, embedded within the coupling filler, is associated to the structural longitudinal elements of the cable before the stranding thereof. At the stranding step, the structural longitudinal elements are stranded with a stranding pitch having substantially the same value of the twisting pitch and having a stranding hand opposite to that of the twisting hand of the single-mode optical fibre of the torsion sensor.

In this way, the resulting cable comprises a fibre optic torsion sensor comprising a single mode optical fibre with a twisting pitch substantially equal to zero.

A twisting pitch substantially equal to zero allows more clear readings by optical detecting techniques, such as Brillouin measurement.

The invention claimed is:

1. A method for monitoring a torsional state of a cable having a central longitudinal axis, comprising:
providing a cable comprising a torsion sensor longitudinally extending along the cable, said torsion sensor comprising a single-mode optical fibre arranged substantially along the central longitudinal axis of the cable, and at least three longitudinal structural elements, at least one of the longitudinal structural elements being an electrically conductive core, wherein the torsion sensor is mechanically coupled with at least one of the longitudinal structural elements;
measuring a torsional state of the single-mode optical fibre by polarisation-sensitive optical reflectometry, said measuring comprising:
injecting a plurality of probe optical signals having distinct input polarisation states into an end of the single-mode optical fibre;
detecting a plurality of backscattered optical signals, each of the plurality of backscattered optical signals having an output state of polarisation;
measuring the output states of polarisation of the backscattered optical signals;
calculating a birefringence angle function as a function of longitudinal position of the single-mode optical fibre from the measured output states of polarization;
calculating a rotational angle function of the single-mode optical fibre from the birefringence angle function as a function of the longitudinal position in the single-mode optical fibre; and
associating the torsional state of the single-mode optical fibre with the calculated rotational angle function, and
wherein the method further comprises associating the torsional state of the cable along the longitudinal axis with the measured torsional state of the single-mode optical fibre.

2. The method of claim 1, wherein the torsion sensor is mechanically coupled to the at least three longitudinal structural elements.

3. The method of claim 1, wherein the torsion sensor is embedded in a coupling filler mechanically coupling the torsion sensor with at least one of the at least three longitudinal structural elements.

4. The method of claim 1, further comprising comparing the measured torsional state of the single-mode optical fibre with a reference torsional state of the single-mode optical fibre before associating the torsional state of the cable with the measured torsional state of the single-mode optical fibre.

5. The method claim 1, further comprising, before injecting a plurality of polarised probe optical signals, preparing a reference birefringence angle function relative to a reference rotational state of the cable, wherein calculating a rotational angle function comprises calculating a variation of the calculated birefringence angle function with respect to the reference birefringence angle function.

6. The method of claim 1, wherein the plurality of polarised probe optical signals is a plurality of N probe optical signals having distinct input states of polarisation, with N≥3, so that the amount of measured output states of polarisation is equal to N, and the method further comprises:
grouping N measured output states of polarisation in G groups of measured output states of polarisations, each group comprising at least two measured output states of polarization, each group being distinct from remaining (G-I) groups by at least one measured output state of polarisation,
calculating a birefringence angle function from each group so as to obtain a plurality of group birefringence angle functions,
calculating an average value of the group birefringence angle functions, and
calculating the rotational angle function from an average value of the group birefringence angle functions.

7. The method of claim 6, wherein calculating a birefringence angle function further comprises:

analysing the plurality of group birefringence angle functions to reveal a discontinuity in a group birefringence angle function;

correcting the discontinuity when a discontinuity in a first group birefringence angle function is revealed at a longitudinal position along a fibre length; and calculating an average value from the first group angle function and from a remaining plurality of group angle functions comprises eliminating the discontinuity.

8. The method of claim 6, wherein calculating a birefringence angle function further comprises:

calculating a difference function between each pair of group birefringence angle functions of two different groups;

analysing each difference function to detect a presence of a discontinuity in a group birefringence angle function in a pair at a longitudinal position in the single-mode optical fibre, the discontinuity representing an angle jump of 2 πm, where m is an integer number;

determining which group birefringence angle function of the pair comprises the discontinuity, and marking a discontinuity length region in the group birefringence angle function of the pair containing the discontinuity, the discontinuity length region being around and comprising the longitudinal position corresponding to the discontinuity, wherein the birefringence angle function containing the discontinuity is taken into account in calculation of the average value of the group birefringence angle functions only for longitudinal positions outside the discontinuity length region.

9. A method for manufacturing an electric cable having a central longitudinal axis, the electric cable comprising:

at least three longitudinal structural elements, at least one of the at least three longitudinal structural elements being an electrically conductive core comprising an electrical conductor; and a torsion sensor comprising a single-mode optical fibre, said torsion sensor arranged substantially along the central longitudinal axis and being mechanically coupled with at least one of the at least three longitudinal structural elements;

the method comprising forming the torsion sensor by:

pre-twisting the single-mode optical fibre with a twisting pitch having a first value and a twisting hand;

coating the single-mode optical fibre with at least one protective layer;

embedding the fibre optic torsion sensor in a coupling filler;

mechanically coupling the coupling filler embedding the fibre optic torsion sensor to a longitudinal structural element; and stranding the longitudinal structural elements around the coupling filler with a stranding pitch having a second value substantially equal to the first value of the twisting pitch and a stranding hand opposite to the twisting hand whereby the electric cable has the single-mode optical fibre with a twisting pitch substantially equal to zero.

10. The method of claim 9, wherein coating the single-mode optical fibre comprises applying at least one of a tight buffer and a protective sheath.

11. The method of claim 9, wherein pre-twisting the optical fibre and coating the optical fibre can be carried out in any order.

12. The method of claim 9, wherein the twisting pitch and the stranding pitch have a first and second value of from 2 to 3 turns/meter.

\* \* \* \* \*